US010771200B2

(12) United States Patent
Cohn et al.

(10) Patent No.: US 10,771,200 B2
(45) Date of Patent: Sep. 8, 2020

(54) METHOD TO DECREASE BLUETOOTH POWER CONSUMPTION FOR PERIODIC TRAFFIC PROFILES

(71) Applicant: Intel Corporation, Santa Clara, CA (US)

(72) Inventors: Daniel Cohn, Oakland, CA (US); Oren Shalita, Tel-Aviv (IL); Hakan Magnus Eriksson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 16/230,809

(22) Filed: Dec. 21, 2018

(65) Prior Publication Data

US 2019/0132091 A1   May 2, 2019

(51) Int. Cl.
| | |
|---|---|
| *H04L 1/18* | (2006.01) |
| *H04W 72/04* | (2009.01) |
| *H04W 52/02* | (2009.01) |
| *H04W 4/80* | (2018.01) |
| *H04L 1/16* | (2006.01) |
| *H04W 84/20* | (2009.01) |

(Continued)

(52) U.S. Cl.
CPC .......... *H04L 1/1854* (2013.01); *H04L 1/1692* (2013.01); *H04L 1/1867* (2013.01); *H04W 4/80* (2018.02); *H04W 52/0261* (2013.01); *H04W 72/0446* (2013.01); *H04L 2001/125* (2013.01); *H04W 24/08* (2013.01); *H04W 84/12* (2013.01); *H04W 84/20* (2013.01)

(58) Field of Classification Search
CPC ... H04L 1/1854; H04L 1/1692; H04L 1/1864; H04W 4/80; H04W 52/0216; H04W 72/0446
USPC ........................................................ 370/329
See application file for complete search history.

(56) References Cited

U.S. PATENT DOCUMENTS

| | | | | |
|---|---|---|---|---|
| 9,002,282 B1 * | 4/2015 | de la Broise | ............ | H04B 1/40 455/63.1 |
| 2006/0205401 A1 * | 9/2006 | Palin | ................... | H04M 1/6066 455/425 |

(Continued)

*Primary Examiner* — Phong La
(74) *Attorney, Agent, or Firm* — Schwegman Lundberg & Woessner, P.A.

(57) ABSTRACT

Embodiments of a mobile device and method of communication are generally described herein. The mobile device may be configured to operate as a slave device for a Bluetooth link with a master device. The mobile device may transmit a packet in an ESCO interval. The mobile device may, in an ESCO retransmission slot of the ESCO interval: attempt to decode, from the slave device, a request for retransmission of the packet. If the request for retransmission is not successfully decoded, the mobile device may determine whether the request for retransmission was sent during the ESCO retransmission slot based at least partly on a channel energy level detected during the ESCO retransmission slot. If it is determined that the request for retransmission was not sent during the ESCO retransmission slot, the mobile device may refrain from monitoring subsequent ESCO retransmission slots of the ESCO interval. If it is determined that the request for retransmission was sent during the ESCO retransmission slot, the mobile device may monitor one or more of the subsequent ESCO retransmission slots of the ESCO interval.

20 Claims, 11 Drawing Sheets

(51) Int. Cl.
*H04W 84/12* (2009.01)
*H04W 24/08* (2009.01)
*H04L 1/12* (2006.01)

(56) References Cited

U.S. PATENT DOCUMENTS

| | | | | |
|---|---|---|---|---|
| 2009/0219904 | A1* | 9/2009 | Khairmode | H04B 1/401 |
| | | | | 370/338 |
| 2011/0002291 | A1* | 1/2011 | Gonikberg | H04W 8/005 |
| | | | | 370/329 |
| 2013/0315217 | A1* | 11/2013 | Chen | H04W 72/1215 |
| | | | | 370/336 |
| 2013/0324113 | A1* | 12/2013 | Jechoux | H04W 74/004 |
| | | | | 455/426.1 |
| 2015/0296397 | A1* | 10/2015 | Dural | H04W 74/04 |
| | | | | 370/252 |
| 2015/0296412 | A1* | 10/2015 | Tarradell | H04W 74/085 |
| | | | | 370/336 |
| 2015/0296468 | A1* | 10/2015 | Dural | H04W 56/003 |
| | | | | 370/336 |
| 2016/0119797 | A1* | 4/2016 | Das | H04W 24/02 |
| | | | | 370/252 |
| 2018/0084456 | A1* | 3/2018 | Gostev | H04L 69/14 |
| 2018/0255548 | A1* | 9/2018 | Kang | H04W 4/80 |
| 2020/0059504 | A1* | 2/2020 | Ho | H04L 65/80 |
| 2020/0075032 | A1* | 3/2020 | Joseph | G10L 19/002 |
| 2020/0084697 | A1* | 3/2020 | Sridhara | H04B 7/15592 |
| 2020/0100307 | A1* | 3/2020 | Sridhara | H04B 17/318 |

* cited by examiner

900

910

US 10,771,200 B2

METHOD TO DECREASE BLUETOOTH POWER CONSUMPTION FOR PERIODIC TRAFFIC PROFILES

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to communication in accordance with Bluetooth.

BACKGROUND

In some cases, a master device and a slave device may communicate over a Bluetooth link. The slave device may be a mobile device for which a battery life is limited. Many factors may affect battery life, including power consumption. In a non-limiting example, various challenges related to performance may arise in interference scenarios, scenarios in which a link margin is reduced and/or other scenarios. In some cases, performance degradation in such scenarios may be overcome by techniques that may also cause a power consumption to be higher than desired. The battery life may be negatively affected in such scenarios as a result. Accordingly, techniques to reduce power consumption and/or improve battery life may be beneficial in these and other scenarios. In addition, techniques to reduce power consumption and/or improve battery life may also be desirable during normal operation and in general.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
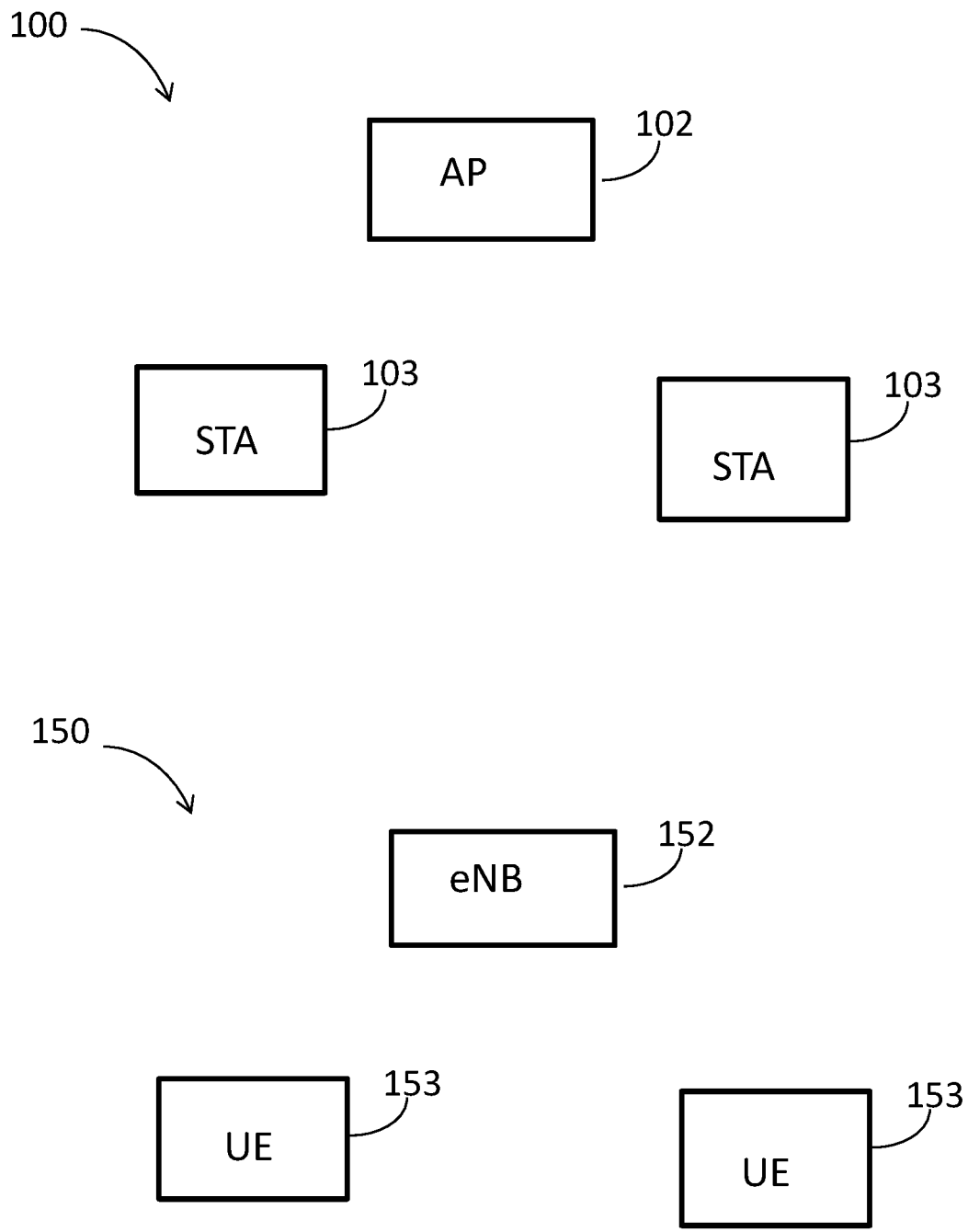
FIG. 1 illustrates example wireless networks in accordance with some embodiments.

FIG. 1 illustrates example wireless networks in accordance with some embodiments. In some embodiments, the network 100 may be a Wireless Local Area Network (WLAN) network. In some embodiments, the network 100 may be a Wi-Fi network. Referring to FIG. 1, the network 100 may include any or all of the components shown, and embodiments are not limited to the number of each component shown in FIG. 1. In some embodiments, the network 100 may include one or more access points (APs) 102. In some embodiments, the network 100 may include any number (including zero) of stations (STAs) 103. In some embodiments, the network 100 may include any number (including zero) of additional components not shown in FIG. 1. In some embodiments, the AP 102 may transmit one or more packets, which may be received by an STA 103. In some embodiments, the STA 103 may transmit one or more packets, which may be received by the AP 102. In some embodiments, the AP 102 and/or STA 103 may be arranged to communicate with one or more of the components shown in FIG. 1 (including but not limited to other APs 102 and/or other STAs 103) in accordance with one or more IEEE 802.11 standards, other standards and/or other communication protocols. These embodiments will be described in more detail below.

In some embodiments, the network 150 may be a Third Generation Partnership Project (3GPP) network. In some embodiments, the network 150 may be a 3GPP Long Term Evolution (LTE) network. Referring to FIG. 1, the network 150 may include any or all of the components shown, and embodiments are not limited to the number of each component shown in FIG. 1. In some embodiments, the network 150 may include one or more Evolved Node-Bs (eNB) 152. In some embodiments, the network 150 may include any number (including zero) of User Equipment (UE) 153. In some embodiments, the network 150 may include any number (including zero) of additional components not shown in FIG. 1. In some embodiments, the eNB 152 may transmit one or more packets, which may be received by a UE 153. In some embodiments, the UE 153 may transmit one or more packets, which may be received by the eNB 152. In some embodiments, the eNB 152 and/or UE 153 may be arranged to communicate with one or more of the components shown in FIG. 1 (including but not limited to other eNBs 152 and/or other UEs 153) in accordance with one or more 3GPP standards, other standards and/or other communication protocols. These embodiments will be described in more detail below.

In some embodiments, an AP 102, STA 103, eNB 152, UE 153 and/or other device may be configured to support communication with another device in accordance with a Bluetooth technique. In some embodiments, communication in accordance with a Bluetooth technique may be performed by one or more of: a Bluetooth device, a stand-alone Bluetooth device, a Bluetooth module included in a device (such as an AP 102, STA 103, eNB 152, UE 153 and/or other device), a device (such as an AP 102, STA 103, eNB 152, UE 153 and/or other device) and/or other component/device. Embodiments herein may refer to performance, by a mobile device and/or processing circuitry of a mobile device, of one or more operations related to communication on a Bluetooth link, but it is understood that such operation(s) may be performed by one or more of: a Bluetooth device, a stand-alone Bluetooth device, a Bluetooth module included in a device (such as an AP 102, STA 103, eNB 152, UE 153 and/or other device), a device (such as an AP 102, STA 103, eNB 152, UE 153 and/or other device) and/or other component/device.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
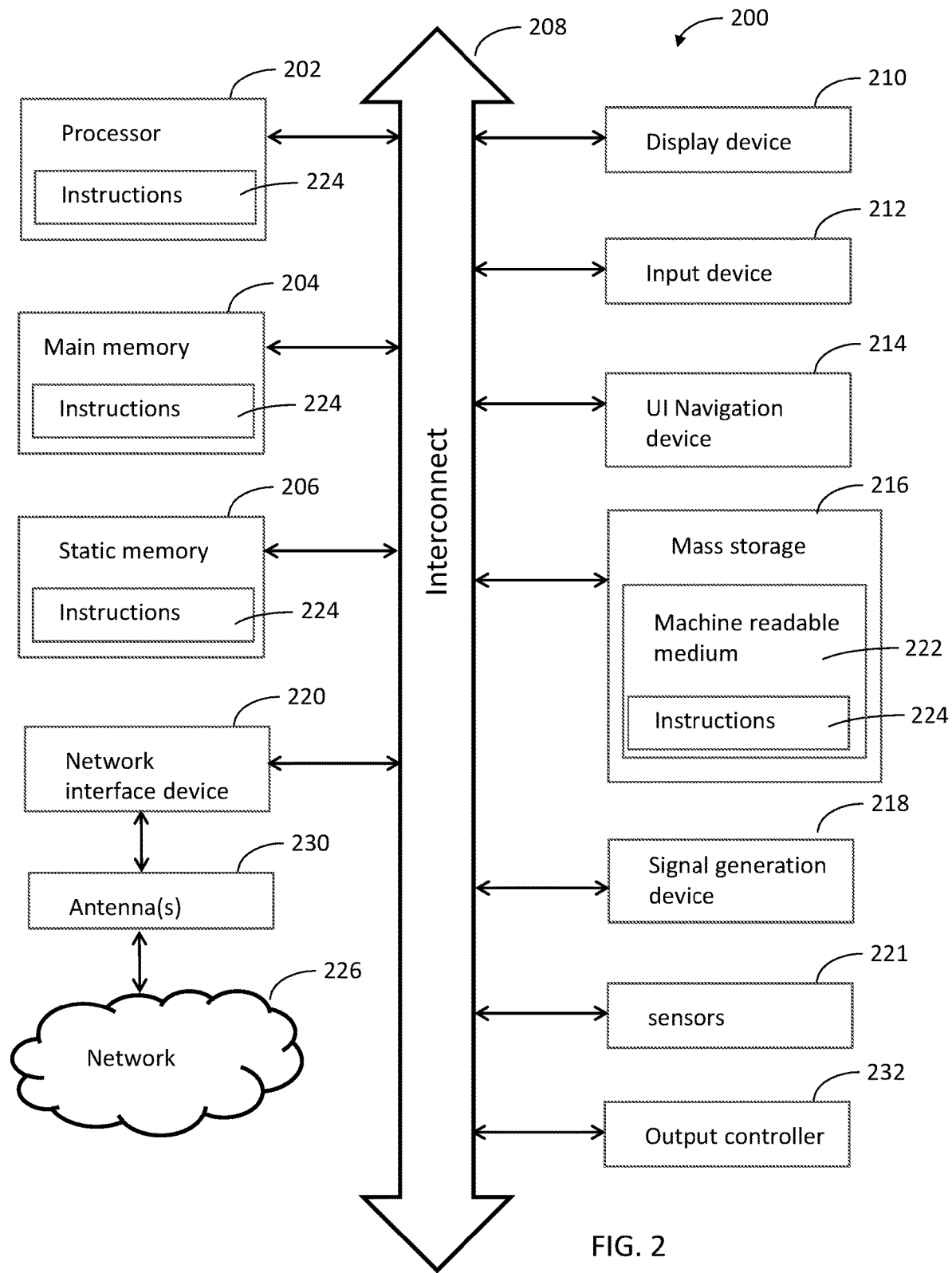
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, a Bluetooth device, a mobile device configured to operate in accordance with a Bluetooth protocol/technique, a mobile device configured to support Bluetooth, a UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
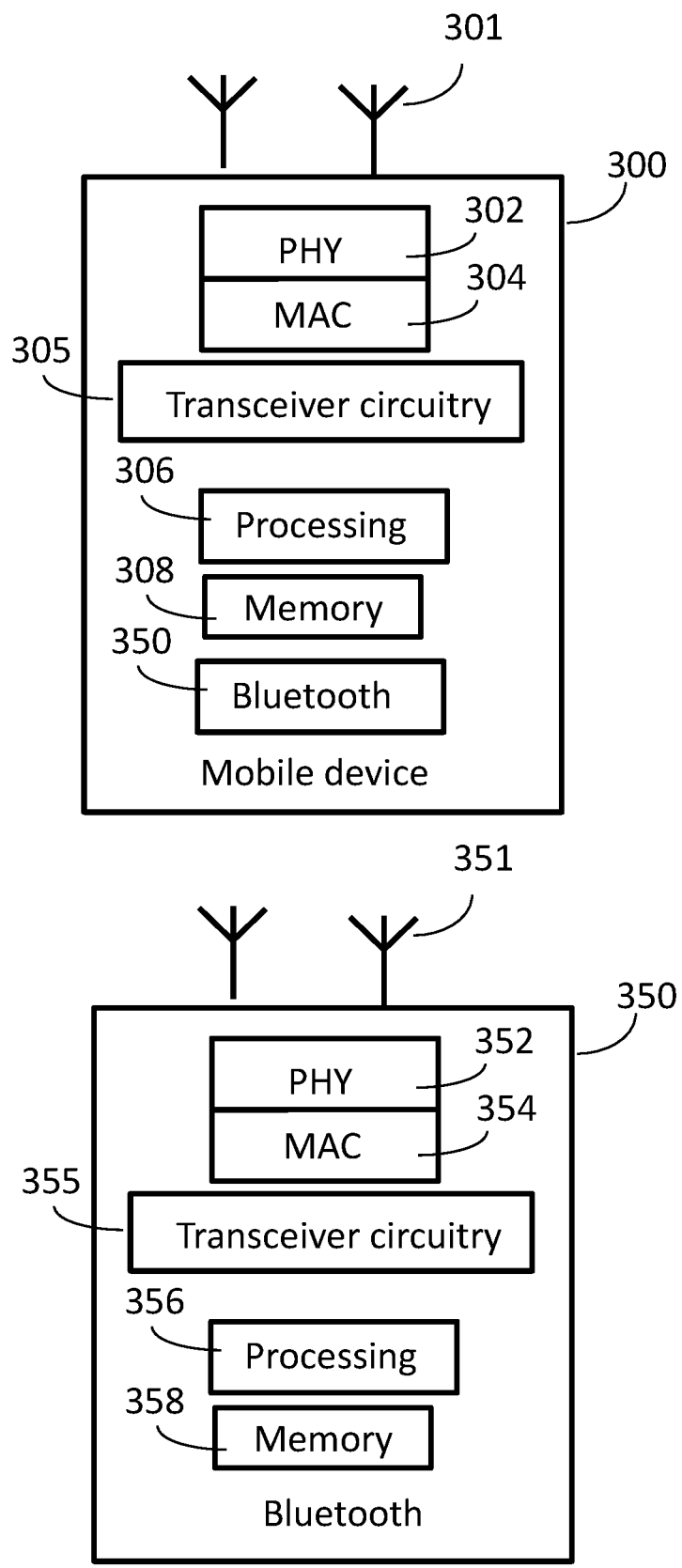
FIG. 3 illustrates a station (STA) in accordance with some embodiments and an access point (AP) in accordance with some embodiments.

FIG. 3 illustrates a mobile device and a Bluetooth device in accordance with some embodiments. It should be noted that in some embodiments, a mobile device (such as an STA 103, UE 153, and/or other mobile device may include components shown in any or all of FIG. 2, FIG. 3 (as in 300 and/or 350), and FIGS. 4-7. The mobile device 300 may be suitable for use as an STA 103 as depicted in FIG. 1, in some embodiments. The mobile device 300 may be suitable for use as a UE 153 as depicted in FIG. 1, in some embodiments. The mobile device 300 may include physical layer circuitry 302 and a transceiver 305, one or both of which may enable transmission and reception of signals to and from components such as the AP 102 (FIG. 1), STAs, EDMG STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 and/or EDMG STA 300 may also include medium access control layer (MAC) circuitry 304 for controlling access to the wireless medium. The STA 300 and/or EDMG STA 300 may also include processing circuitry 306 and memory 308 arranged to perform the operations described herein.

In some embodiments, the mobile device 300 may include a Bluetooth module 350, and the Bluetooth module 350 may perform one or more operations related to a Bluetooth technique/protocol. The scope of embodiments is not limited in this respect, however. In some embodiments, one or more of the components of the mobile device 300 (such as 302-308) may perform one or more operations related to the Bluetooth technique/protocol. In some embodiments, one or more operations related to the Bluetooth technique/protocol may be performed by one or more of the components 302-308 and/or the Bluetooth module 350. In some embodiments, the Bluetooth module 350 may be a standalone module and/or device. In some embodiments, the Bluetooth module 350 may be integrated with the mobile device 300.

The Bluetooth module 350 may include physical layer circuitry 352 and a transceiver 355, one or both of which may enable transmission and reception of signals to and from other devices/components using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The Bluetooth module 350 may also include medium access control layer (MAC) circuitry 354 for controlling access to the wireless medium. The Bluetooth module 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the mobile device 300 may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the mobile device 300 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the mobile device 300 may include one or more of a keyboard, a display, a non-volatile memory port, multiple antennas, a graphics processor, an application processor, speakers, and other mobile device elements. The display may be an LCD screen including a touch screen.

Although the mobile device 300, and the Bluetooth module 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the mobile device 300 may include various components of the mobile device 300 as shown in FIG. 3 and/or the example machine 200 as shown in FIG. 2. Accordingly, techniques and operations described herein that refer to the mobile device 300 may be applicable to an apparatus for a mobile device, in some embodiments.

Figure 4:
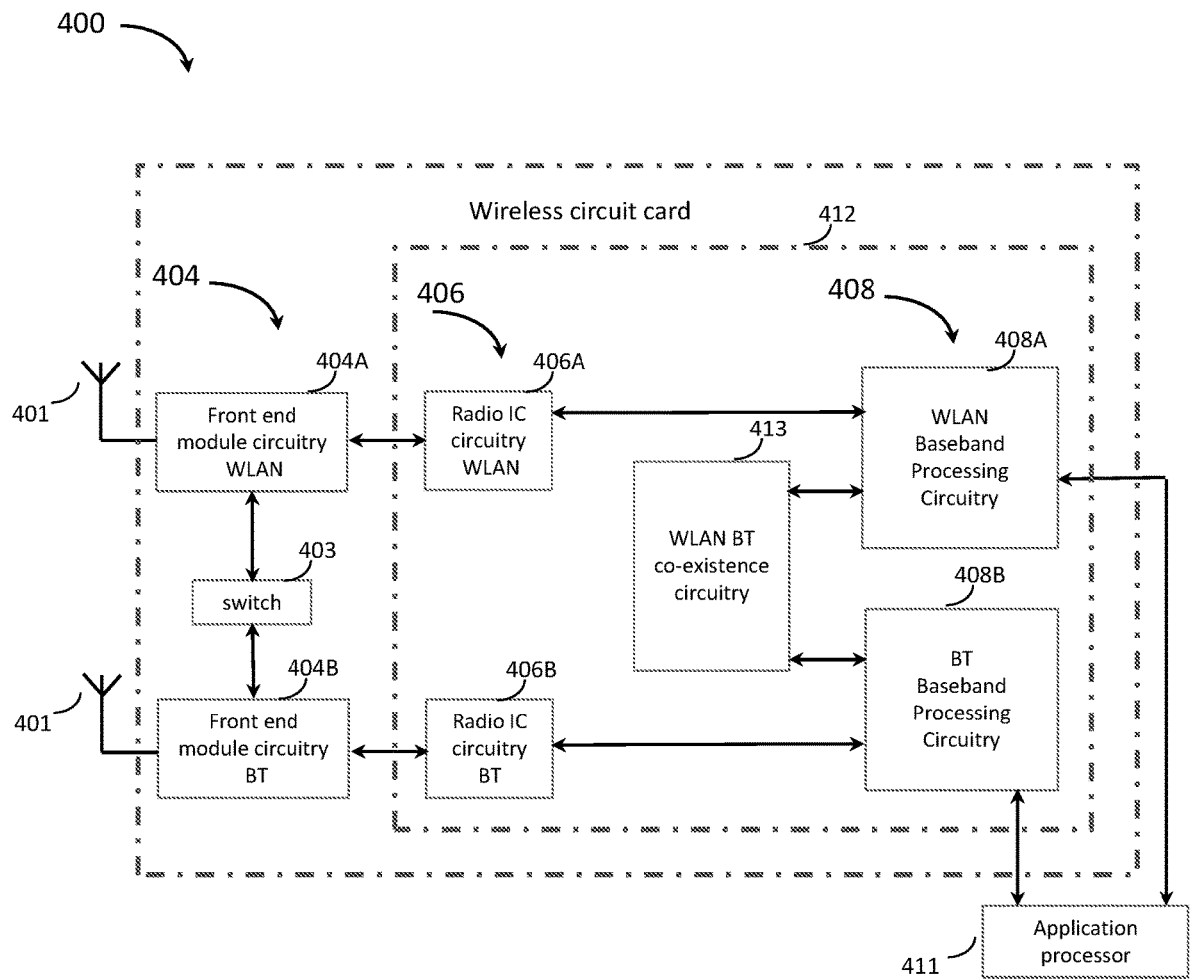
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

Although a dual-mode architecture is shown in FIGS. 4-7, it is understood that embodiments are not limited to dual-mode architectures. In some embodiments, a single-mode architecture may include one or more of the components shown in FIGS. 4-7. In some embodiments, one or more of the functionalities described below for the dual-mode architecture of FIGS. 4-7 may be performed in a single-mode architecture. In a non-limiting example: the single-mode architecture may include components arranged in a manner similar to one of the paths of the dual-mode architecture; and some or all of the functionality of one of the paths of the dual-mode architecture (and/or similar functionality) may be performed in the single-mode architecture.

Figure 5:
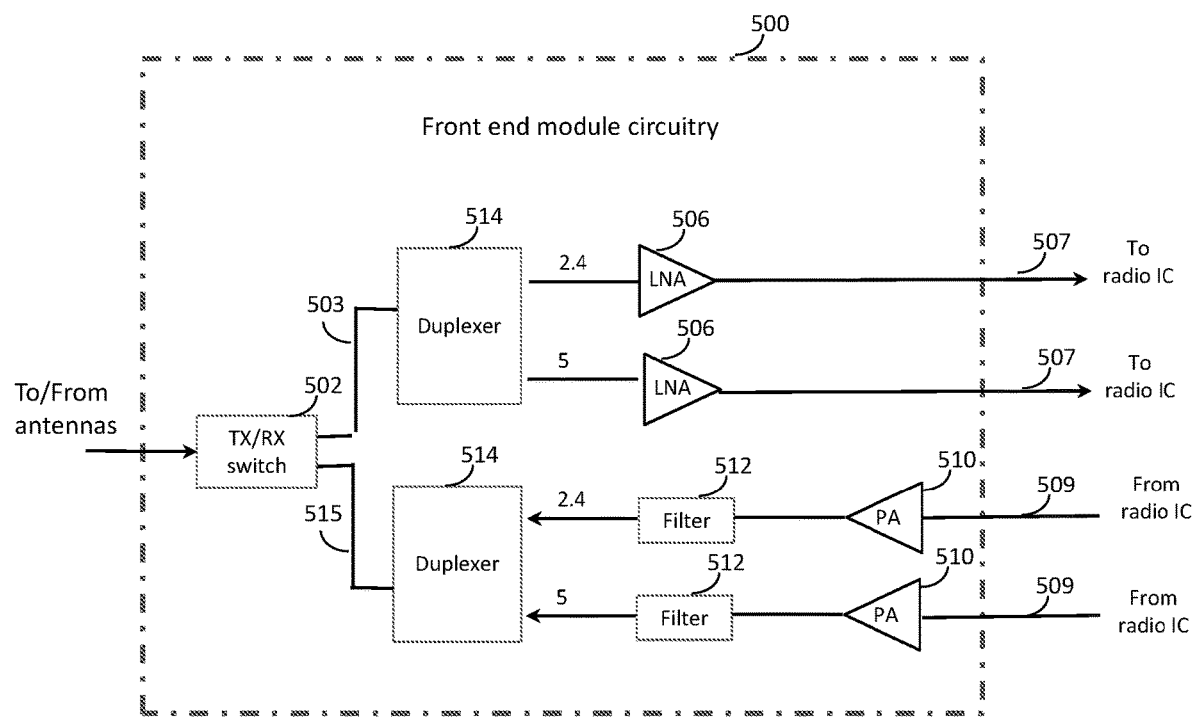
FIG. 5 illustrates a front-end module circuitry for use in the radio architecture of FIG. 4 in accordance with some embodiments.
Figure 6:
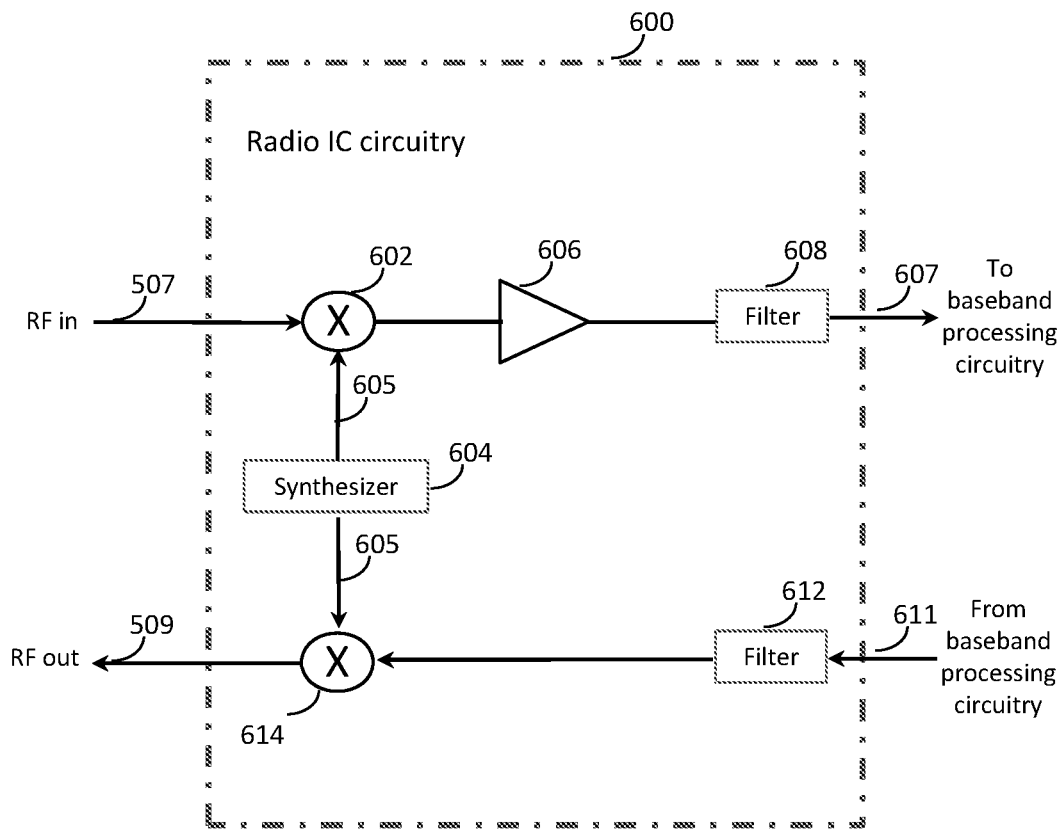
FIG. 6 illustrates a radio IC circuitry for use in the radio architecture of FIG. 4 in accordance with some embodiments.
Figure 7:
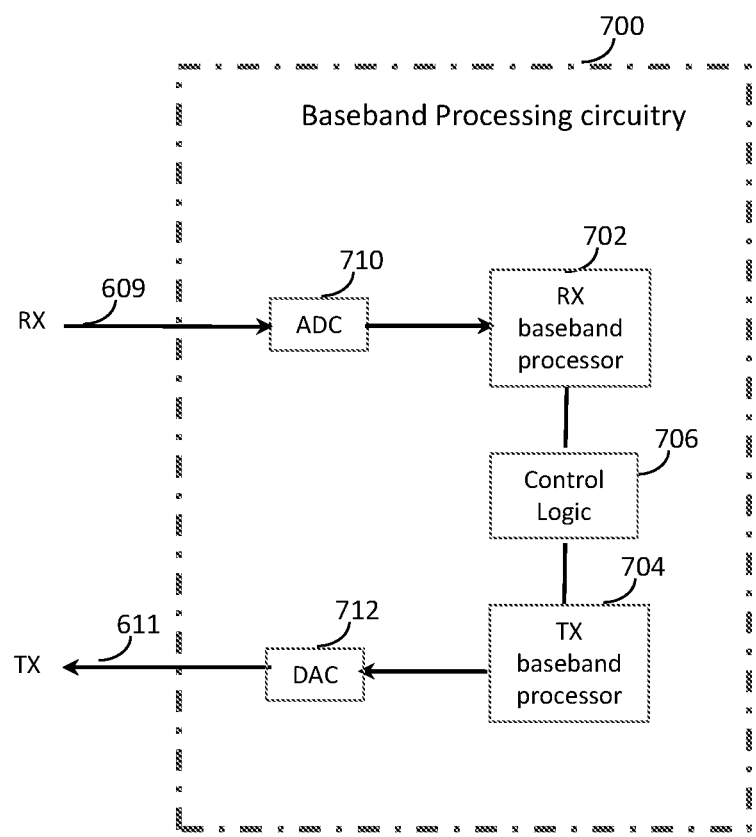
FIG. 7 illustrates a baseband processing circuitry for use in the radio architecture of FIG. 4 in accordance with some embodiments.

It should be noted that the radio architecture 400 and components shown in FIGS. 5-7 support WLAN and BT, but embodiments are not limited to WLAN or BT. In some embodiments, two technologies supported by the radio architecture 400 may or may not include WLAN or BT. Other technologies may be supported, including but not limited to 3GPP and/or 3GPP LTE. In some embodiments, BT and a 3GPP technology may be supported. In some embodiments, BT and a 3GPP LTE technology may be supported. Accordingly, components shown in FIGS. 4-7 may be referred to in descriptions as "WLAN" components (such as WLAN circuitry 404A), but the scope of embodiments is not limited in this respect. Same or similar components that support other protocols (such as 3GPP and/or 3GPP LTE) may be used, in some embodiments. In addition, the radio architecture 400 may be extended to support more than two protocols, technologies and/or standards, in some embodiments. Embodiments are also not limited to the frequencies illustrated in FIGS. 4-7.

FEM circuitry 404 may include a WLAN or Wi-Fi FEM circuitry 404A and a Bluetooth (BT) FEM circuitry 404B. The WLAN FEM circuitry 404A may include a receive signal path comprising circuitry configured to operate on WLAN RF signals received from one or more antennas 401, to amplify the received signals and to provide the amplified versions of the received signals to the WLAN radio IC circuitry 406A for further processing. The BT FEM circuitry 404B may include a receive signal path which may include circuitry configured to operate on BT RF signals received from one or more antennas 401, to amplify the received signals and to provide the amplified versions of the received signals to the BT radio IC circuitry 406B for further processing. FEM circuitry 404A may also include a transmit signal path which may include circuitry configured to amplify WLAN signals provided by the radio IC circuitry 406A for wireless transmission by one or more of the antennas 401. In addition, FEM circuitry 404B may also include a transmit signal path which may include circuitry configured to amplify BT signals provided by the radio IC circuitry 406b for wireless transmission by the one or more antennas. In the embodiment of FIG. 4, although FEM 404A and FEM 404B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406A and BT radio IC circuitry 406B. The WLAN radio IC circuitry 406A may include a receive signal path which may include circuitry to down-convert WLAN RF signals received from the FEM circuitry 404A and provide baseband signals to WLAN baseband processing circuitry 408a. BT radio IC circuitry 406B may in turn include a receive signal path which may include circuitry to down-convert BT RF signals received from the FEM circuitry 404B and provide baseband signals to BT baseband processing circuitry 408B. WLAN radio IC circuitry 406A may also include a transmit signal path which may include circuitry to up-convert WLAN baseband signals provided by the WLAN baseband processing circuitry 408A and provide WLAN RF output signals to the FEM circuitry 404A for subsequent wireless transmission by the one or more antennas 401. BT radio IC circuitry 406B may also include a transmit signal path which may include circuitry to up-convert BT baseband signals provided by the BT baseband processing circuitry 408B and provide BT RF output signals to the FEM circuitry 404B for subsequent wireless transmission by the one or more antennas 401. In the embodiment of FIG. 4, although radio IC circuitries 406A and 406B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 408 may include a WLAN baseband processing circuitry 408A and a BT baseband processing circuitry 408B. The WLAN baseband processing circuitry 408A may include a memory, such as, for example, a set of RAM arrays in a Fast Fourier Transform or Inverse Fast Fourier Transform block (not shown) of the WLAN baseband processing circuitry 408A. Each of the WLAN baseband circuitry 408A and the BT baseband circuitry 408B may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408A and 408B may further include physical layer (PHY) and medium access control layer (MAC) circuitry, and may further interface with application processor 411 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408A and the BT baseband circuitry 408B to enable use cases requiring WLAN and BT coexistence. In addition, a switch 403 may be provided between the WLAN FEM circuitry 404A and the BT FEM circuitry 404B to allow switching between the WLAN and BT radios according to application needs. In addition, although the antennas 401 are depicted as being respectively connected to the WLAN FEM circuitry 404A and the BT FEM circuitry 404B, embodiments include within their scope the sharing of one or more antennas as between the WLAN and BT FEMs, or the provision of more than one antenna connected to each of FEM 404A or 404B.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and/or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications). In some IEEE 802.11 embodiments, the radio architecture 400 may be configured for communication over various channel bandwidths including bandwidths having center frequencies of about 900 MHz, 2.4 GHz, 5 GHz and/or other(s). In some embodiments, the bandwidths may be about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. In some embodiments, the bandwidths may be about 2.16 GHz, 4.32 GHz, 6.48 GHz, 8.72 GHz and/or other suitable value. The scope of the embodiments is not limited with respect to the above center frequencies or bandwidths, however.

FIG. 5 illustrates FEM circuitry 500 in accordance with some embodiments. The FEM circuitry 500 is one example of circuitry that may be suitable for use as the WLAN and/or BT FEM circuitry 404A/404B (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) 510 to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

FIG. 6 illustrates radio IC circuitry 600 in accordance with some embodiments. The radio IC circuitry 600 is one example of circuitry that may be suitable for use as the WLAN or BT radio IC circuitry 406A/406B (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 602 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, a frequency-locked loop or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 604 may be provided by a voltage controlled oscillator (VCO), although that is not a requirement. A divider control input may further be provided by either the baseband processing circuitry 408 (FIG. 4) or the application processor 411 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 411.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency ($f_{LO}$).

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408A, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with some embodiments, an apparatus of a mobile device 300 may comprise memory. The apparatus may further comprise processing circuitry. The mobile device 300 may be configured to operate as a slave device for a Bluetooth link with a master device. When the mobile device 300 operates as the slave device, the processing circuitry may be configured to encode a packet for transmission in a transmit enhanced synchronous connection-oriented (ESCO) slot of an ESCO interval. When the mobile device 300 operates as the slave device, the processing circuitry may be further configured to, in an ESCO retransmission slot of the ESCO interval: attempt to decode, from the slave device, a request for retransmission of the packet. When the mobile device 300 operates as the slave device, the processing circuitry may be configured to, if the request for retransmission is not successfully decoded: determine whether the request for retransmission was sent during the ESCO retransmission slot based at least partly on a channel energy level detected during the ESCO retransmission slot. When the mobile device 300 operates as the slave device, the processing circuitry may be further configured to, if it is determined that the request for retransmission was not sent during the ESCO retransmission slot: refrain from monitoring subsequent ESCO retransmission slots of the ESCO interval. When the mobile device 300 operates as the slave device, the processing circuitry may be further configured to, if it is determined that the request for retransmission was sent during the ESCO retransmission slot: monitor one or more of the subsequent ESCO retransmission slots of the ESCO interval for an additional request for retransmission of the packet. These embodiments will be described in more detail below.

Figure 8:
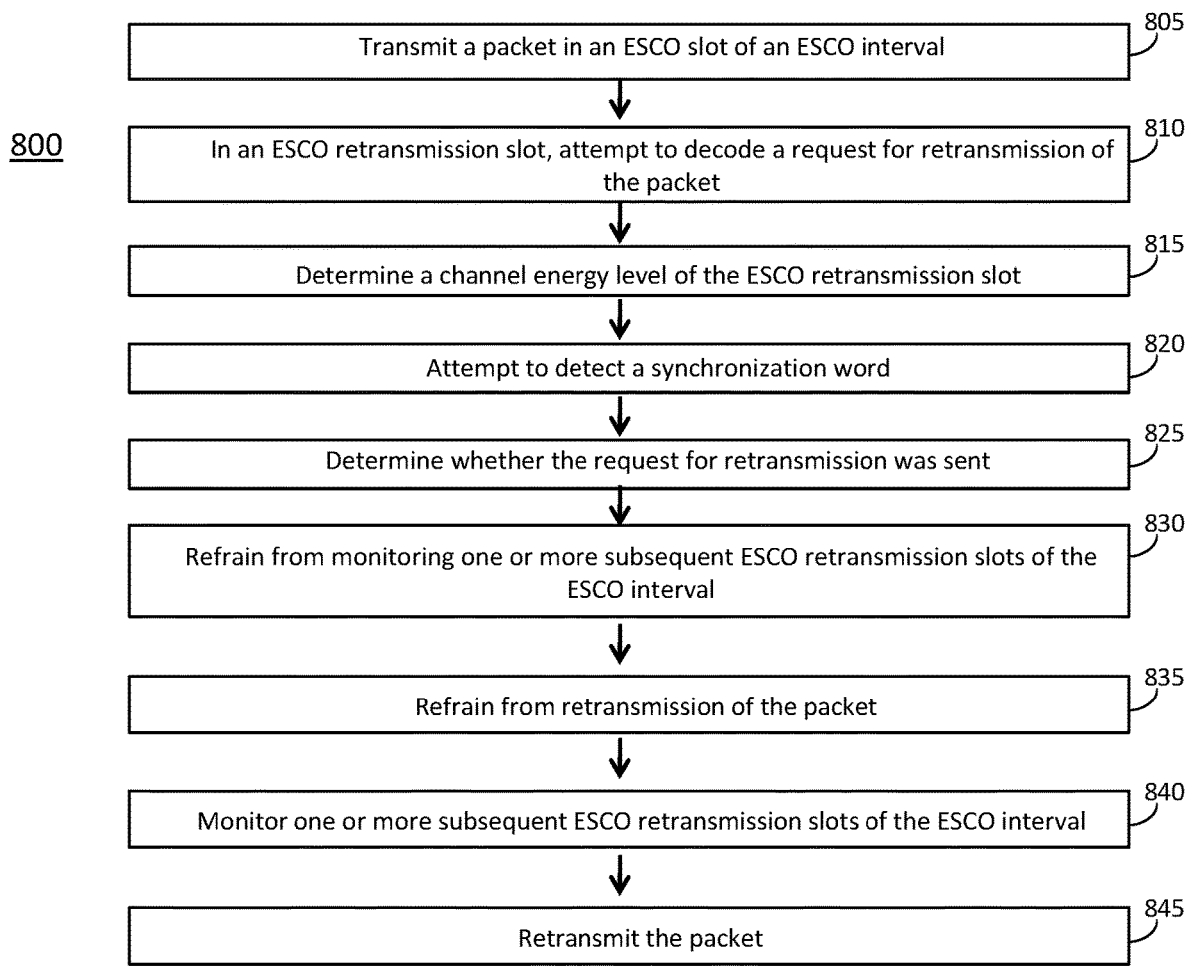
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the methods 800 are not necessarily limited to the chronological order that is shown in FIG. 8. In describing the method 800, reference may be made to one or more figures, although it is understood that the method 800 may be practiced with any other suitable systems, interfaces and components.

In some embodiments, a mobile device 300 configured to operate in accordance with a Bluetooth technique may perform one or more operations of the method 800, but embodiments are not limited to performance of the method 800 and/or operations of it by the mobile device 300. In some embodiments, a Bluetooth module 350 may perform one or more operations of the method 800. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800.

The method 800 and other methods described herein may refer to APs 102, STAs 103, eNBs 152 and/or UEs 153 operating in accordance with WLAN standards, 802.11 standards, 3GPP standards, 3GPP LTE standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to 5G standards, New Radio (NR) standards and/or other standards.

In some embodiments, the method 800 may also be applicable to an apparatus of a mobile device 300, an apparatus of a Bluetooth module 350 and/or an apparatus of another device described above.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations, intervals, frames, time periods and/or other) described herein may be included in a standard and/or protocol, including but not limited to a Bluetooth standard and/or other. The scope of embodiments is not limited to usage of elements that are included in standards, however.

In some embodiments, the mobile device 300 may be configured to operate as a slave device for a Bluetooth link with a master device. The mobile device 300 may perform one or more operations of the method 800 (and/or other operations) when the mobile device 300 operates as the slave device, although the scope of embodiments is not limited in this respect.

At operation 805, the mobile device 300 may transmit a packet in a transmit enhanced synchronous connection-oriented (ESCO) slot of an ESCO interval. At operation 810, the mobile device 300 may, in an ESCO retransmission slot, attempt to decode a request for retransmission of the packet. In some embodiments, the ESCO retransmission slot may be received from the slave device, although the scope of embodiments is not limited in this respect.

In some embodiments, the ESCO interval may include a transmit ESCO slot, a receive ESCO slot, and a plurality of ESCO retransmission slots. In some embodiments, the ESCO interval may include a transmit ESCO slot, a receive ESCO slot, and one or more ESCO retransmission slots. In some embodiments, the ESCO interval may further include one or more asynchronous connection-less (ACL) slots. Embodiments are not limited to usage of a plurality of ESCO retransmission slots, as one or more ESCO retransmission slots may be included in the ESCO interval, in some embodiments.

In some embodiments, the transmit ESCO slot may be for transmission of packets by the slave device, although the scope of embodiments is not limited in this respect. In some embodiments, the transmit ESCO slot may be for transmission of packets by the master device, although the scope of embodiments is not limited in this respect. In some embodiments, the ESCO retransmission slots may be for transmission, by the master device, of requests for retransmission packets by the slave device, although the scope of embodiments is not limited in this respect. In some embodiments, the ACL slots may be for control messages from the master device, although the scope of embodiments is not limited in this respect.

At operation 815, the mobile device 300 may determine a channel energy level of the ESCO retransmission slot. At operation 820, the mobile device 300 may attempt to detect a synchronization word. At operation 825, the mobile device 300 may determine whether the request for retransmission was sent. In some embodiments, operation 825 may be based at least partly on result(s) of one or more of operations 815 and 820 and/or other operation(s), although the scope of embodiments is not limited in this respect.

At operation 830, the mobile device 300 may refrain from monitoring one or more subsequent ESCO retransmission slots of the ESCO interval. At operation 835, the mobile device 300 may refrain from retransmission of the packet. At operation 840, the mobile device 300 may monitor one or more subsequent ESCO retransmission slots of the ESCO interval. At operation 845, the mobile device 300 may retransmit the packet.

It should be noted that the mobile device 300 may not necessarily perform all operations shown in FIG. 8. For instance, the mobile device 300 may not necessarily perform operations 830 and 840, in some cases. In addition, the mobile device 300 may not necessarily perform operations 835 and 845, in some cases.

In some embodiments, the mobile device 300 may, if the request for retransmission is not successfully decoded, determine whether the request for retransmission was sent during the ESCO retransmission slot based at least partly on a channel energy level detected during the ESCO retransmission slot. In some embodiments, the mobile device 300 may, if the request for retransmission is not successfully decoded, determine whether the request for retransmission was sent by the master device during the ESCO retransmission slot based at least partly on a channel energy level detected during the ESCO retransmission slot.

In some embodiments, the mobile device 300 may, if it is determined that the request for retransmission was not sent during the ESCO retransmission slot, refrain from monitoring subsequent ESCO retransmission slots of the ESCO interval. In some embodiments, the mobile device 300 may, if it is determined that the request for retransmission was sent during the ESCO retransmission slot, monitor one or more of the subsequent ESCO retransmission slots of the ESCO interval for an additional request for retransmission of the packet.

In some embodiments, the mobile device 300 may, if it is determined that the request for retransmission was not sent by the master device during the ESCO retransmission slot, refrain from retransmission of the packet. In some embodiments, the mobile device 300 may, if the request for retransmission of the packet is successfully decoded: retransmit the packet in a subsequent ESCO interval; and refrain from monitoring the subsequent ESCO retransmission slots of the ESCO interval.

In some embodiments, the mobile device 300 may, if it is determined that the request for retransmission was not sent by the master device during the ESCO retransmission slot, refrain from monitoring one or more ACL slots of the ESCO interval. In some embodiments, the mobile device 300 may, if it is determined that the request for retransmission was not sent by the master device during the ESCO retransmission slot, refrain from monitoring during the ESCO interval until one of the ACL slots.

In some embodiments, the mobile device 300 may determine that the request for retransmission was not sent by the master device during the ESCO retransmission slot if the channel energy level is less than a threshold. In some embodiments, the mobile device 300 may determine that the request for retransmission was sent by the master device during the ESCO retransmission slot if the channel energy level is greater than or equal to the threshold. In some embodiments, the mobile device 300 may determine the channel energy level of the ESCO retransmission slot based at least partly on energy received at the mobile device during at least a portion of the ESCO retransmission slot.

In some embodiments, the mobile device 300 may attempt to detect a synchronization word during the ESCO retransmission slot. The mobile device may determine that the request for retransmission was not sent by the master device during the ESCO retransmission slot if: the synchronization word is not detected during the ESCO retransmission slot, and the channel energy level is less than a threshold. The mobile device may determine that the request for retransmission was sent by the master device during the ESCO retransmission slot if: the synchronization word is detected during the ESCO retransmission slot, or the channel energy level is greater than or equal to the threshold.

In some embodiments, the mobile device 300 may determine whether a co-located device or other device is active during the ESCO interval in a channel used for the Bluetooth link. The mobile device may, if it is determined that a co-located device or other device is active during the ESCO interval in a channel used for the Bluetooth link, monitor one or more of the subsequent ESCO retransmission slots of the ESCO interval for an additional request for retransmission of the packet.

In some embodiments, the mobile device 300 may transmit a packet in a transmit ESCO slot of an ESCO interval that includes the transmit ESCO slot, a receive ESCO slot, and a first plurality of ESCO retransmission slots. The mobile device 300 may, in a second plurality of ESCO retransmission slots included in the first plurality of ESCO retransmission slots: attempt to decode, from the slave device, at least one request for retransmission of the packet; and determine per-slot channel energy levels. The mobile device 300 may, if at least one request for retransmission is not successfully decoded in the second plurality of ESCO retransmission slots and if the per-slot channel energy levels are less than a threshold: refrain from monitoring the remaining ESCO retransmission slots of the first plurality of ESCO retransmission slots; and refrain from retransmission of the packet.

In some embodiments, the mobile device 300 may, if at least one request for retransmission is not successfully decoded in the second plurality of ESCO retransmission slots and if at least one of the per-slot channel energy levels is greater than or equal to the threshold: monitor one or more of the remaining ESCO retransmission slots of the first plurality of ESCO retransmission slots. The mobile device 300 may, if at least one request for retransmission is successfully decoded in the second plurality of ESCO retransmission slots: refrain from monitoring the remaining ESCO retransmission slots of the first plurality of ESCO retransmission slots; and refrain from retransmission of the packet.

In some embodiments, the mobile device 300 may attempt to detect a synchronization word during the second plurality of ESCO retransmission slots. The mobile device 300 may determine that the request for retransmission was not sent by the master device during the second plurality of ESCO retransmission slots if: the synchronization word is not detected during the second plurality of ESCO retransmission slots, and the per-slot channel energy levels are less than a threshold. The mobile device 300 may determine that the request for retransmission was sent by the master device during the second plurality of ESCO retransmission slots if: the synchronization word is detected during the second plurality of ESCO retransmission slots, or at least one of the per-slot channel energy levels is greater than or equal to the threshold.

In some embodiments, the mobile device 300 may, if it is determined that the request for retransmission was not sent by the master device during the second plurality of ESCO retransmission slots, refrain from monitoring during the ESCO interval until one of the ACL slots.

In some embodiments, the mobile device 300 may transmit a packet in a transmit ESCO slot of an ESCO interval. The mobile device 300 may, in an ESCO retransmission slot of the ESCO interval: attempt to decode, from the slave device, a request for retransmission of the packet. The mobile device 300 may determine a channel energy level of the ESCO retransmission slot. The mobile device 300 may, if the request for retransmission of the packet is not successfully decoded and the channel energy level is less than a threshold: refrain from monitoring subsequent ESCO retransmission slots of the ESCO interval; and refrain from retransmission of the packet. The mobile device 300 may, if the request for retransmission of the packet is not successfully decoded and the channel energy level is greater than or equal to the threshold: monitor one or more of the subsequent ESCO retransmission slots of the ESCO interval for requests for retransmission of the packet.

In some embodiments, the mobile device 300 may, if the request for retransmission of the packet is successfully decoded: retransmit the packet in a subsequent ESCO interval; and refrain from monitoring the subsequent ESCO retransmission slots of the ESCO interval.

In some embodiments, an apparatus of a mobile device 300 may comprise memory. The memory may be configurable to store at least a portion of the packet. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding the packet.

In some embodiments, the apparatus may include a Bluetooth transceiver to transmit the packet. The Bluetooth transceiver may transmit and/or receive other blocks, messages and/or other elements. In some embodiments, the Bluetooth transceiver co-located with a wireless local area network (WLAN) transceiver or a cellular transceiver, although the scope of embodiments is not limited in this respect.

Figure 9:
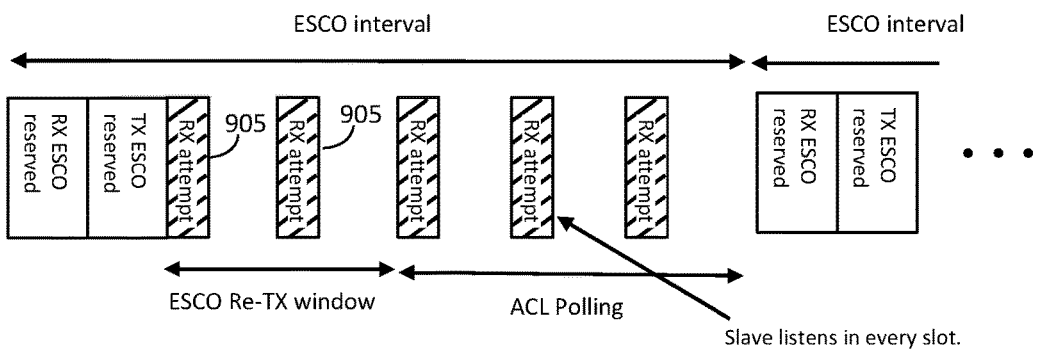
FIG. 9 illustrates example arrangements of elements in ESCO frames in accordance with some embodiments.
Figure 9:
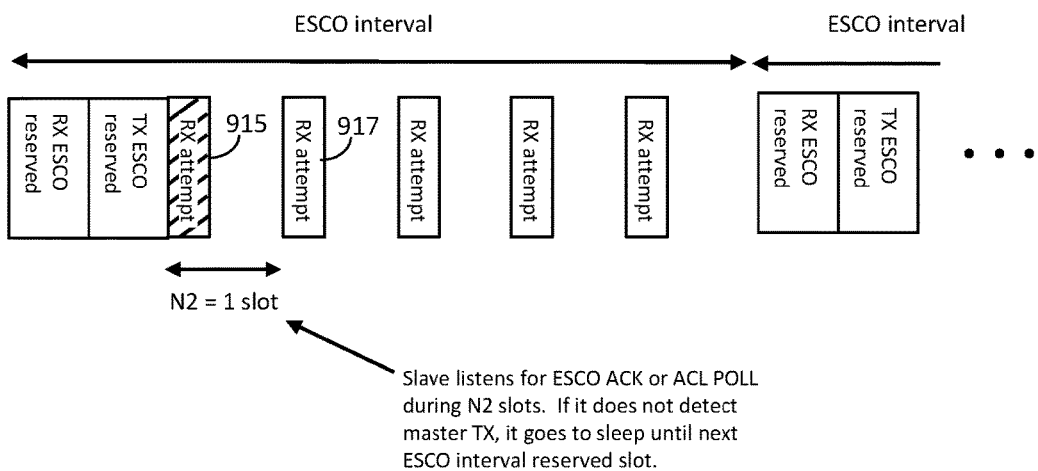
Figure 10:
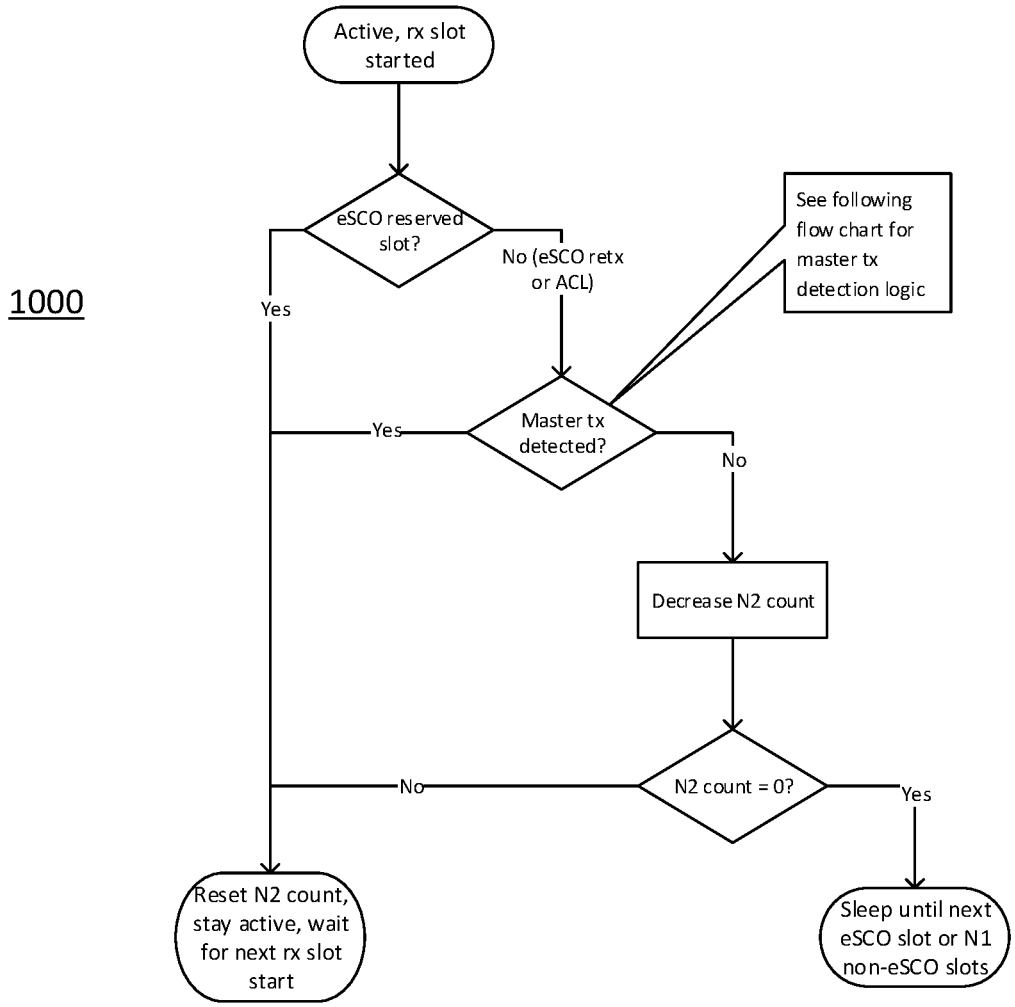
FIG. 10 illustrates an example flowchart in accordance with some embodiments.
Figure 11:
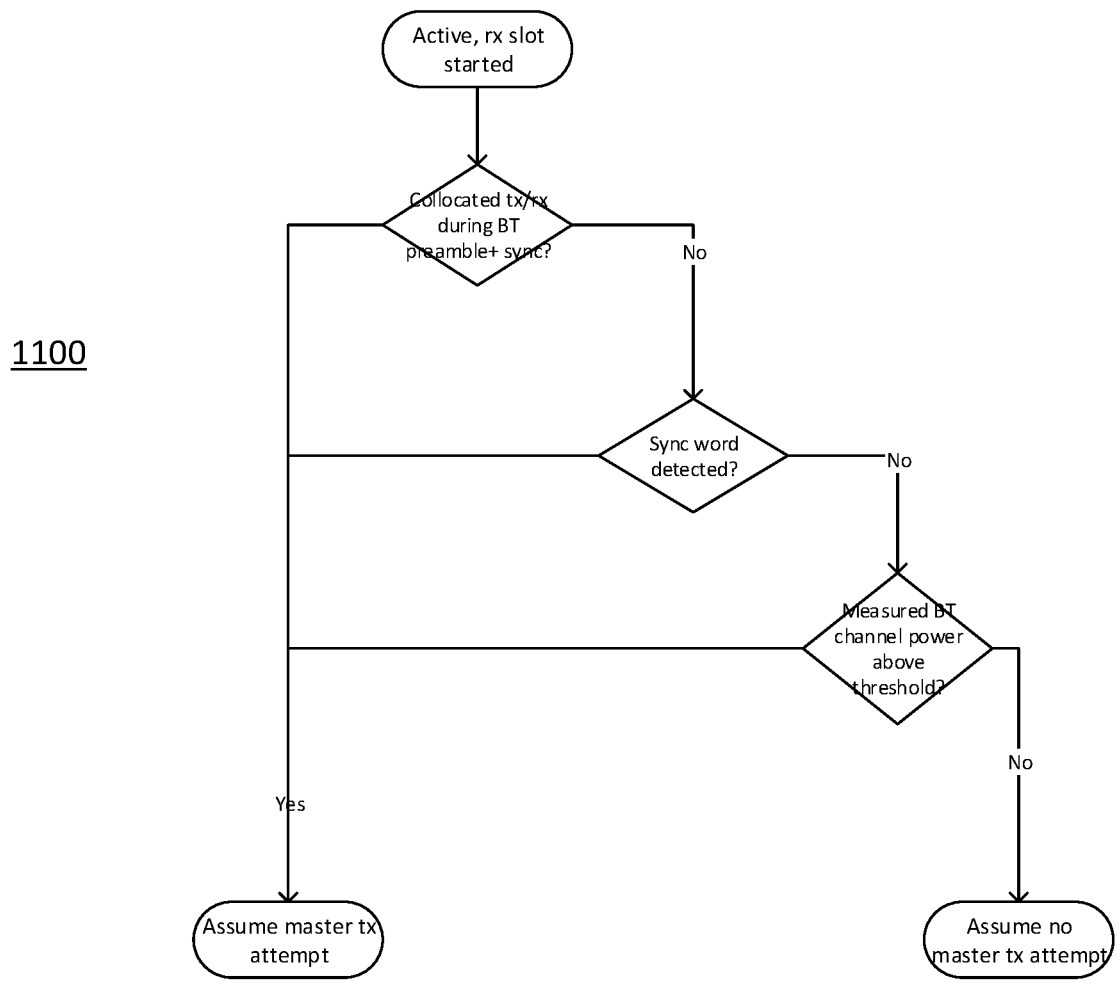
FIG. 11 illustrates an example flowchart in accordance with some embodiments.

FIG. 9 illustrates example arrangements of elements in ESCO frames in accordance with some embodiments. FIG. 10 illustrates an example flowchart in accordance with some embodiments. FIG. 11 illustrates an example flowchart in accordance with some embodiments. It should be noted that the examples shown in FIGS. 9-11 may illustrate some or all of the concepts and techniques described herein in some cases, but embodiments are not limited by the examples. For instance, embodiments are not limited by the name, number, type, size, ordering, arrangement of elements (such as devices, operations, messages, frames, slots, intervals and/or other elements) shown in FIGS. 9-11. Although some of the elements shown in the examples of FIGS. 9-11 may be included in a Bluetooth standard and/or other standard, embodiments are not limited to usage of such elements that are included in standards.

In some embodiments, when in a slave role, a Bluetooth device may be expected to listen for transmissions in every slot in which packets can be transmitted by the master. For example, when an eSCO link is active (typically used for voice traffic using the hands-free profile), the slave may be required to listen at the reserved eSCO slot. In addition, if the slave doesn't receive an acknowledgement from the master (this acknowledgement may not be mandatory and some vendors may not necessarily send it), the slave may be expected to listen at all eSCO retransmission slots.

In some embodiments, devices using the hands-free profile may use an ACL best-effort connection for non-time-critical control packets. Listening at these slots may have a similar impact on Bluetooth power consumption and collocated technologies performance, in some cases. Listening at all eSCO retransmission slots and all ACL slots may increase the device power consumption, in some cases. In addition, when collocated technologies (such as WiFi, LTE and/or other) are present, BT listening periods may be protected from collocated interference. This protection may result in collocated technology performance degradation (for instance, Wi-Fi or LTE lower throughput or even disconnection).

The above may also be true for a link in sniff mode, wherein the slave may be expected to listen for master transmissions during all sniff attempt slots. The problem may not necessarily be relevant for the master role, since the master may control the traffic so that it can decide in which slots to transmit and to listen.

In some embodiments, the slave may be expected to listen in all eSCO retransmission slots in order to allow the master to request a retransmission in case it did not correctly receive the packet transmitted in the reserved slot. This may be true even if the slave did not receive a retransmission request in the first retransmission slot, because the master might have sent a retransmission request that the slave did not correctly decode due to: poor link conditions, interference and/or other.

Furthermore, devices with an eSCO link (including but not limited to headsets) may also use an ACL connection for control messages. In the slave role in active mode, the device may also be expected to listen in all non-eSCO slots for ACL packets. In some cases, control traffic may not necessarily be latency sensitive. It may tolerate delays on the order of 10-100 ms without performance impact, in some cases.

In some embodiments, a mechanism for slave devices may significantly reduce the number of slots in which they listen for the master, without any loss of BT performance. This may achieve lower power consumption reduction and may reduce contention between BT and other collocated technologies (for instance, WiFi, LTE and/or other), which in turn may improve the performance of said technologies. This may be accomplished by distinguishing a case in which the master did not send a retransmission request from a case in which the master did send a request but it was not correctly received.

In some embodiments, for eSCO slots, in a first case, it may be assumed that the master received the first transmission correctly and will not send a request for retransmission. In this case, in one or more of the techniques, operations and/or methods described herein, the slave may treat the remaining eSCO slots as non-eSCO slots for the purpose of whether it should listen or not. Also for eSCO slots, in the second case, it may be assumed that the master did not receive the first transmission correctly and will send additional requests for retransmission so the slave should listen at the next eSCO retransmission slot.

In some embodiments, for non-eSCO slots, in one or more of the techniques, operations and/or methods described herein, the slave device may listen once every N1 non-eSCO slots. If an attempted transmission by the master is detected in this slot, the slave may listen also for the following non-eSCO slot, regardless of whether the transmission by the master was correctly decoded or not. If no master attempted transmission is detected for N2 consecutive non-eSCO slots, the slave will not listen again until the next N1 slot.

One or more of the techniques, operations and/or methods described below and elsewhere herein may be related to distinguishing between the case in which the master did not send a retransmission request from the case in which the master did send a request but it was not correctly received. In some embodiments, energy detection may be used. If energy is not detected at the slot, it may be assumed that there was no master transmission. If energy is detected but a valid packet cannot be detected, it may be assumed that there was a master transmission that was corrupted by bad link conditions or interference. In some embodiments, collocated technology real-time information may be used. If a collocated technology is transmitting or receiving with high power and/or low frequency separation, it may be assumed that energy detection is not accurate so it may be assumed that the master was transmitting.

In FIG. 9, non-limiting examples 900 and 910 are shown. The example 900 may illustrate legacy behavior, although the scope of embodiments is not limited in this respect. In the example 900, the mobile device 300 may listen to all of the slots 905 (which may be ESCO retransmission slots and/or ACL slots) for purposes such as: reception/decoding of request(s) for retransmission, reception/decoding of ACL messages and/or other.

The example 910 may illustrate behavior of the mobile device 300 in accordance with some embodiments described herein. Receive slots depicted by the pattern 915 represent slots in which the mobile device (as a slave device) listens for energy. Received slots depicted by the pattern 917 represent slots in which the slave does not listen for energy.

In some embodiments, one or more of the techniques, operations and/or methods may be applicable to links in sniff mode. In these links, even if no valid packet is received at the sniff anchor point, the slave may be expected to listen at the following sniff attempt slots. Similarly to the eSCO scenario, if the slave determines that the master did not send any packet in the first N2 sniff attempt slots, the slave may refrain from listening in the remaining sniff attempt slots.

In some embodiments, one or more of the techniques, operations and/or methods described herein may decrease Bluetooth power consumption and/or increase collocated technology performance (such as Wi-Fi and LTE) when Bluetooth is in the slave role and a periodic traffic profile (for instance, HFP or HID) is active. In some cases, in a WiFi transmission+HFP slave scenario, one or more of the techniques, operations and/or methods described herein may enable an improvement (such as a 25% WiFi throughput increase and/or other) for N2=1. In some cases, a similar improvement may be expected for LTE.

In some embodiments, one or more aspects of a listening logic of the slave may be replaced, extended, reduced, changed and/or modified. For instance, a standard logic may include one or more of the following: in active mode, the slave may listen in every receive slot; in sniff mode, the slave may listen in every sniff attempt slot; and/or other. In some embodiments, one or more aspects of the standard logic described above may be replaced, extended, reduced, changed and/or modified.

In some embodiments, the slave may perform listening logic illustrated in 1000 in FIG. 10. In some embodiments, the slave may operate in accordance with one or more operations and/or aspects shown in the flow chart shown in FIG. 10. The method 1000 is a non-limiting example. Some embodiments may include one or more additional operations/aspects not shown in FIG. 10. Some embodiments may not necessarily include all operations/aspects shown in FIG. 10. Embodiments are not limited to the arrangement, ordering, names, types and other aspects shown in FIG. 10.

In the slave goes to sleep mode, it may arm a timer to wake up for the next eSCO reserved slot or the next non-eSCO slot after N1 such slots have been skipped.

In some embodiments, for links in sniff mode, the above logic may be applicable. For instance, in the above description and/or FIG. 10, eSCO reserved slots may be substituted with sniff attempt slots.

In some embodiments, the "master TX detected" decision shown in FIG. 10 may include one or more operations and/or aspects shown in FIG. 11. The method 1100 is a non-limiting example. Some embodiments may include one or more additional operations/aspects not shown in FIG. 11. Some embodiments may not necessarily include all operations/aspects shown in FIG. 11. Embodiments are not limited to the arrangement, ordering, names, types and other aspects shown in FIG. 11.

In Example 1, a mobile device may be configured to operate as a slave device for a Bluetooth link with a master device. An apparatus of the mobile device may comprise memory. The apparatus may further comprise processing circuitry. When the mobile device operates as the slave device, the processing circuitry may be configured to encode a packet for transmission in a transmit enhanced synchronous connection-oriented (ESCO) slot of an ESCO interval. When the mobile device operates as the slave device, the processing circuitry may be further configured to, in an ESCO retransmission slot of the ESCO interval: attempt to decode, from the slave device, a request for retransmission of the packet. When the mobile device operates as the slave device, the processing circuitry may be further configured to, if the request for retransmission is not successfully decoded: determine whether the request for retransmission was sent during the ESCO retransmission slot based at least partly on a channel energy level detected during the ESCO retransmission slot. When the mobile device operates as the slave device, the processing circuitry may be further configured to, if it is determined that the request for retransmission was not sent during the ESCO retransmission slot, refrain from monitoring subsequent ESCO retransmission slots of the ESCO interval. When the mobile device operates as the slave device, the processing circuitry may be further configured to, if it is determined that the request for retransmission was sent during the ESCO retransmission slot, monitor one or more of the subsequent ESCO retransmission slots of the ESCO interval for an additional request for retransmission of the packet.

In Example 2, the subject matter of Example 1, wherein when the mobile device operates as the slave device, the processing circuitry may be further configured to, if it is determined that the request for retransmission was not sent by the master device during the ESCO retransmission slot: refrain from retransmission of the packet.

In Example 3, the subject matter of one or any combination of Examples 1-2, wherein when the mobile device operates as the slave device, the processing circuitry may be further configured to, if the request for retransmission of the packet is successfully decoded: encode the packet for retransmission in a subsequent ESCO interval; and refrain from monitoring the subsequent ESCO retransmission slots of the ESCO interval.

In Example 4, the subject matter of one or any combination of Examples 1-3, wherein when the mobile device operates as the slave device, the processing circuitry may be further configured to determine that the request for retransmission was not sent by the master device during the ESCO retransmission slot if the channel energy level is less than a threshold. When the mobile device operates as the slave device, the processing circuitry may be further configured to determine that the request for retransmission was sent by the master device during the ESCO retransmission slot if the channel energy level is greater than or equal to the threshold.

In Example 5, the subject matter of one or any combination of Examples 1-4, wherein when the mobile device operates as the slave device, the processing circuitry may be further configured to determine the channel energy level of the ESCO retransmission slot based at least partly on energy received at the mobile device during at least a portion of the ESCO retransmission slot.

In Example 6, the subject matter of one or any combination of Examples 1-5, wherein when the mobile device operates as the slave device, the processing circuitry may be further configured to determine whether a co-located device or other device is active during the ESCO interval in a channel used for the Bluetooth link. When the mobile device operates as the slave device, the processing circuitry may be further configured to, if it is determined that a co-located device or other device is active during the ESCO interval in a channel used for the Bluetooth link: monitor one or more of the subsequent ESCO retransmission slots of the ESCO interval for an additional request for retransmission of the packet.

In Example 7, the subject matter of one or any combination of Examples 1-6, wherein when the mobile device operates as the slave device, the processing circuitry may be further configured to attempt to detect a synchronization word during the ESCO retransmission slot. When the mobile device operates as the slave device, the processing circuitry may be further configured to determine that the request for retransmission was not sent by the master device during the ESCO retransmission slot if: the synchronization word is not detected during the ESCO retransmission slot, and the channel energy level is less than a threshold.

In Example 8, the subject matter of one or any combination of Examples 1-7, wherein when the mobile device operates as the slave device, the processing circuitry may be further configured to determine that the request for retransmission was sent by the master device during the ESCO retransmission slot if: the synchronization word is detected during the ESCO retransmission slot, or the channel energy level is greater than or equal to the threshold.

In Example 9, the subject matter of one or any combination of Examples 1-8, wherein when the mobile device operates as the slave device, the processing circuitry may be further configured to, if it is determined that the request for retransmission was not sent by the master device during the ESCO retransmission slot: refrain from monitoring one or more asynchronous connection-less (ACL) slots of the ESCO interval.

In Example 10, the subject matter of one or any combination of Examples 1-9, wherein the ESCO interval may include: the transmit ESCO slot for transmission of packets by the slave device, a receive ESCO slot for transmission of packets by the master device, and a plurality of ESCO retransmission slots for transmission, by the master device, of requests for retransmission.

In Example 11, the subject matter of one or any combination of Examples 1-10, wherein the ESCO interval may further include one or more asynchronous connection-less (ACL) slots after the ESCO retransmission slots. The ACL slots may be for control messages from the master device. When the mobile device operates as the slave device, the processing circuitry may be further configured to, if it is determined that the request for retransmission was not sent by the master device during the ESCO retransmission slot: refrain from monitoring during the ESCO interval until one of the ACL slots.

In Example 12, the subject matter of one or any combination of Examples 1-11, wherein: the mobile device may be a User Equipment (UE) arranged to operate in accordance with a Third Generation Partnership Project (3GPP) protocol; or the mobile device may be a station (STA) arranged to operate in accordance with a wireless local area network (WLAN) protocol.

In Example 13, the subject matter of one or any combination of Examples 1-12, wherein the apparatus may include a Bluetooth transceiver to transmit the packet. The Bluetooth transceiver may be co-located with a wireless local area network (WLAN) transceiver or a cellular transceiver. The processing circuitry may include a baseband processor to encode the packet. The memory may be configured to store at least a portion of the packet.

In Example 14, a mobile device may be configured to operate as a slave device for a Bluetooth link with a master device. A non-transitory computer-readable storage medium may store instructions for execution by processing circuitry of the mobile device. When the mobile device operates as the slave device, the operations may configure the processing circuitry to encode a packet for transmission in a transmit enhanced synchronous connection-oriented (ESCO) slot of an ESCO interval. The ESCO interval may include the transmit ESCO slot, a receive ESCO slot, and a first plurality of ESCO retransmission slots. When the mobile device operates as the slave device, the operations may further configure the processing circuitry to, in a second plurality of ESCO retransmission slots included in the first plurality of ESCO retransmission slots: attempt to decode, from the slave device, at least one request for retransmission of the packet; and determine per-slot channel energy levels. When the mobile device operates as the slave device, the operations may further configure the processing circuitry to, if at least one request for retransmission is not successfully decoded in the second plurality of ESCO retransmission slots and if the per-slot channel energy levels are less than a threshold: refrain from monitoring the remaining ESCO retransmission slots of the first plurality of ESCO retransmission slots; and refrain from retransmission of the packet.

In Example 15, the subject matter of Example 14, wherein when the mobile device operates as the slave device, the operations may further configure the processing circuitry to, if at least one request for retransmission is not successfully decoded in the second plurality of ESCO retransmission slots and if at least one of the per-slot channel energy levels is greater than or equal to the threshold: monitor one or more of the remaining ESCO retransmission slots of the first plurality of ESCO retransmission slots.

In Example 16, the subject matter of one or any combination of Examples 14-15, wherein when the mobile device operates as the slave device, the operations may further configure the processing circuitry to, if at least one request for retransmission is successfully decoded in the second plurality of ESCO retransmission slots: refrain from monitoring the remaining ESCO retransmission slots of the first plurality of ESCO retransmission slots; and refrain from retransmission of the packet.

In Example 17, the subject matter of one or any combination of Examples 14-16, wherein when the mobile device operates as the slave device, the operations may further configure the processing circuitry to attempt to detect a synchronization word during the second plurality of ESCO retransmission slots. When the mobile device operates as the slave device, the operations may further configure the processing circuitry to determine that the request for retransmission was not sent by the master device during the second plurality of ESCO retransmission slots if: the synchronization word is not detected during the second plurality of ESCO retransmission slots, and the per-slot channel energy levels are less than a threshold. When the mobile device operates as the slave device, the operations may further configure the processing circuitry to determine that the request for retransmission was sent by the master device during the second plurality of ESCO retransmission slots if: the synchronization word is detected during the second plurality of ESCO retransmission slots, or at least one of the per-slot channel energy levels is greater than or equal to the threshold.

In Example 18, the subject matter of one or any combination of Examples 14-17, wherein the ESCO interval may further include one or more asynchronous connection-less (ACL) slots after the ESCO retransmission slots. The ACL slots may be for control messages from the master device. When the mobile device operates as the slave device, the operations may further configure the processing circuitry to, if it is determined that the request for retransmission was not sent by the master device during the second plurality of ESCO retransmission slots: refrain from monitoring during the ESCO interval until one of the ACL slots.

In Example 19, a mobile device may be configured to operate as a slave device for a Bluetooth link with a master device. An apparatus of the mobile device may comprise memory. The apparatus may further comprise processing circuitry. When the mobile device operates as the slave device, the processing circuitry may be configured to encode a packet for transmission in a transmit enhanced synchronous connection-oriented (ESCO) slot of an ESCO interval. When the mobile device operates as the slave device, the processing circuitry may be further configured to, in an ESCO retransmission slot of the ESCO interval: attempt to decode, from the slave device, a request for retransmission of the packet. When the mobile device operates as the slave device, the processing circuitry may be further configured to determine a channel energy level of the ESCO retransmission slot. When the mobile device operates as the slave device, the processing circuitry may be further configured to, if the request for retransmission of the packet is not successfully decoded and the channel energy level is less than a threshold: refrain from monitoring subsequent ESCO retransmission slots of the ESCO interval; and refrain from retransmission of the packet. When the mobile device operates as the slave device, the processing circuitry may be further configured to, if the request for retransmission of the packet is not successfully decoded and the channel energy level is greater than or equal to the threshold: monitor one or more of the subsequent ESCO retransmission slots of the ESCO interval for requests for retransmission of the packet.

In Example 20, the subject matter of Example 19, wherein when the mobile device operates as the slave device, the processing circuitry may be further configured to, if the request for retransmission of the packet is successfully decoded: encode the packet for retransmission in a subsequent ESCO interval; and refrain from monitoring the subsequent ESCO retransmission slots of the ESCO interval.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a mobile device, the mobile device configured to operate as a slave device for a Bluetooth link with a master device, the apparatus comprising: memory; and processing circuitry, wherein when the mobile device operates as the slave device, the processing circuitry is configured to:
    encode a packet for transmission in a transmit enhanced synchronous connection-oriented (ESCO) slot of an ESCO interval;
    in an ESCO retransmission slot of the ESCO interval:
        attempt to decode, from the slave device, a request for retransmission of the packet;
    if the request for retransmission is not successfully decoded, determine whether the request for retransmission was sent during the ESCO retransmission slot based at least on a channel energy level detected during the ESCO retransmission slot;
    if it is determined that the request for retransmission was not sent during the ESCO retransmission slot, refrain from monitoring subsequent ESCO retransmission slots of the ESCO interval; and
    if it is determined that the request for retransmission was sent during the ESCO retransmission slot, monitor one or more of the subsequent ESCO retransmission slots of the ESCO interval for an additional request for retransmission of the packet.

2. The apparatus according to claim 1, wherein when the mobile device operates as the slave device, the processing circuitry is further configured to:
    if it is determined that the request for retransmission was not sent by the master device during the ESCO retransmission slot, refrain from retransmission of the packet.

3. The apparatus according to claim 1, wherein when the mobile device operates as the slave device, the processing circuitry is further configured to:
    if the request for retransmission of the packet is successfully decoded:
        encode the packet for retransmission in a subsequent ESCO interval; and
        refrain from monitoring the subsequent ESCO retransmission slots of the ESCO interval.

4. The apparatus according to claim 1, wherein when the mobile device operates as the slave device, the processing circuitry is further configured to:

determine that the request for retransmission was not sent by the master device during the ESCO retransmission slot if the channel energy level is less than a threshold; and determine that the request for retransmission was sent by the master device during the ESCO retransmission slot if the channel energy level is greater than or equal to the threshold.

5. The apparatus according to claim 1, wherein when the mobile device operates as the slave device, the processing circuitry is further configured to:

determine the channel energy level of the ESCO retransmission slot based at least partly on energy received at the mobile device during at least a portion of the ESCO retransmission slot.

6. The apparatus according to claim 1, wherein when the mobile device operates as the slave device, the processing circuitry is further configured to:

determine whether a co-located device or other device is active during the ESCO interval in a channel used for the Bluetooth link; and if it is determined that a co-located device or other device is active during the ESCO interval in a channel used for the Bluetooth link, monitor one or more of the subsequent ESCO retransmission slots of the ESCO interval for an additional request for retransmission of the packet.

7. The apparatus according to claim 1, wherein when the mobile device operates as the slave device, the processing circuitry is further configured to:

attempt to detect a synchronization word during the ESCO retransmission slot; and determine that the request for retransmission was not sent by the master device during the ESCO retransmission slot if:
 the synchronization word is not detected during the ESCO retransmission slot, and
 the channel energy level is less than a threshold.

8. The apparatus according to claim 7, wherein when the mobile device operates as the slave device, the processing circuitry is further configured to:

determine that the request for retransmission was sent by the master device during the ESCO retransmission slot if:
 the synchronization word is detected during the ESCO retransmission slot, or
 the channel energy level is greater than or equal to the threshold.

9. The apparatus according to claim 1, wherein when the mobile device operates as the slave device, the processing circuitry is further configured to:

if it is determined that the request for retransmission was not sent by the master device during the ESCO retransmission slot, refrain from monitoring one or more asynchronous connection-less (ACL) slots of the ESCO interval.

10. The apparatus according to claim 1, wherein the ESCO interval includes:

the transmit ESCO slot for transmission of packets by the slave device, a receive ESCO slot for transmission of packets by the master device, and a plurality of ESCO retransmission slots for transmission, by the master device, of requests for retransmission.

11. The apparatus according to claim 1, wherein:

the ESCO interval further includes one or more asynchronous connection-less (ACL) slots after the ESCO retransmission slots, the ACL slots are for control messages from the master device, and when the mobile device operates as the slave device, the processing circuitry is further configured to, if it is determined that the request for retransmission was not sent by the master device during the ESCO retransmission slot, refrain from monitoring during the ESCO interval until one of the ACL slots.

12. The apparatus according to claim 1, wherein:

the mobile device is a User Equipment (UE) arranged to operate in accordance with a Third Generation Partnership Project (3GPP) protocol, or the mobile device is a station (STA) arranged to operate in accordance with a wireless local area network (WLAN) protocol.

13. The apparatus according to claim 1, wherein:

the apparatus includes a Bluetooth transceiver to transmit the packet, the Bluetooth transceiver co-located with a wireless local area network (WLAN) transceiver or a cellular transceiver, the processing circuitry includes a baseband processor to encode the packet, and the memory is configured to store at least a portion of the packet.

14. A non-transitory computer-readable storage medium that stores instructions for execution by processing circuitry of a mobile device, the mobile device configured to operate as a slave device for a Bluetooth link with a master device, wherein when the mobile device operates as the slave device, the operations configure the processing circuitry to:

encode a packet for transmission in a transmit enhanced synchronous connection-oriented (ESCO) slot of an ESCO interval, wherein the ESCO interval includes the transmit ESCO slot, a receive ESCO slot, and a first plurality of ESCO retransmission slots;

in a second plurality of ESCO retransmission slots included in the first plurality of ESCO retransmission slots:
 attempt to decode, from the slave device, at least one request for retransmission of the packet; and
 determine per-slot channel energy levels;

if at least one request for retransmission is not successfully decoded in the second plurality of ESCO retransmission slots and if the per-slot channel energy levels are less than a threshold:
 refrain from monitoring the remaining ESCO retransmission slots of the first plurality of ESCO retransmission slots; and
 refrain from retransmission of the packet.

15. The non-transitory computer-readable storage medium according to claim 14, wherein when the mobile device operates as the slave device, the operations further configure the processing circuitry to:

if at least one request for retransmission is not successfully decoded in the second plurality of ESCO retransmission slots and if at least one of the per-slot channel energy levels is greater than or equal to the threshold:
 monitor one or more of the remaining ESCO retransmission slots of the first plurality of ESCO retransmission slots.

16. The non-transitory computer-readable storage medium according to claim 14, wherein when the mobile device operates as the slave device, the operations further configure the processing circuitry to:
if at least one request for retransmission is successfully decoded in the second plurality of ESCO retransmission slots:
refrain from monitoring the remaining ESCO retransmission slots of the first plurality of ESCO retransmission slots; and
refrain from retransmission of the packet.

17. The non-transitory computer-readable storage medium according to claim 14, wherein when the mobile device operates as the slave device, the operations further configure the processing circuitry to:
attempt to detect a synchronization word during the second plurality of ESCO retransmission slots; and
determine that the request for retransmission was not sent by the master device during the second plurality of ESCO retransmission slots if:
the synchronization word is not detected during the second plurality of ESCO retransmission slots, and
the per-slot channel energy levels are less than a threshold;
determine that the request for retransmission was sent by the master device during the second plurality of ESCO retransmission slots if:
the synchronization word is detected during the second plurality of ESCO retransmission slots, or
at least one of the per-slot channel energy levels is greater than or equal to the threshold.

18. The non-transitory computer-readable storage medium according to claim 14, wherein:
the ESCO interval further includes one or more asynchronous connection-less (ACL) slots after the ESCO retransmission slots,
the ACL slots are for control messages from the master device,
when the mobile device operates as the slave device, the operations further configure the processing circuitry to:
if it is determined that the request for retransmission was not sent by the master device during the second plurality of ESCO retransmission slots, refrain from monitoring during the ESCO interval until one of the ACL slots.

19. An apparatus of a mobile device, the mobile device configured to operate as a slave device for a Bluetooth link with a master device, the apparatus comprising: memory; and processing circuitry, wherein when the mobile device operates as the slave device, the processing circuitry is configured to:
encode a packet for transmission in a transmit enhanced synchronous connection-oriented (ESCO) slot of an ESCO interval;
in an ESCO retransmission slot of the ESCO interval:
attempt to decode, from the slave device, a request for retransmission of the packet;
determine a channel energy level of the ESCO retransmission slot;
if the request for retransmission of the packet is not successfully decoded and the channel energy level is less than a threshold:
refrain from monitoring subsequent ESCO retransmission slots of the ESCO interval; and
refrain from retransmission of the packet;
if the request for retransmission of the packet is not successfully decoded and the channel energy level is greater than or equal to the threshold:
monitor one or more of the subsequent ESCO retransmission slots of the ESCO interval for requests for retransmission of the packet.

20. The apparatus according to claim 19, wherein when the mobile device operates as the slave device, the processing circuitry is further configured to:
if the request for retransmission of the packet is successfully decoded:
encode the packet for retransmission in a subsequent ESCO interval; and
refrain from monitoring the subsequent ESCO retransmission slots of the ESCO interval.

* * * * *